United States Patent
Amacker et al.

(10) Patent No.: US 11,175,199 B2
(45) Date of Patent: Nov. 16, 2021

(54) MOBILE PLATFORM WITH SACRIFICIAL BODY USED TO SIMULATE A VEHICLE DURING COLLISION TESTING

(71) Applicant: Toyota Research Institute, Inc., Los Altos, CA (US)

(72) Inventors: Matthew Amacker, Santa Clara, CA (US); Joseph Taylor, San Jose, CA (US); Gregory J. Klein, San Mateo, CA (US); Jonathan Yao, San Jose, CA (US); Andrew Custer, Oakland, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 196 days.

(21) Appl. No.: 16/513,111

(22) Filed: Jul. 16, 2019

(65) Prior Publication Data

US 2021/0018401 A1   Jan. 21, 2021

(51) Int. Cl.
*G01M 17/00* (2006.01)
*G01M 17/007* (2006.01)
*G08G 1/16* (2006.01)

(52) U.S. Cl.
CPC .... *G01M 17/0078* (2013.01); *G01M 17/0074* (2013.01); *G08G 1/16* (2013.01)

(58) Field of Classification Search
CPC .............................................. G01M 17/0078
See application file for complete search history.

(56) References Cited

U.S. PATENT DOCUMENTS

| | | | |
|---|---|---|---|
| 5,403,112 A * | 4/1995 | Carney, III | E01F 15/146 256/13.1 |
| 5,483,845 A * | 1/1996 | Stein | G01M 17/0078 73/12.01 |
| 5,635,624 A * | 6/1997 | Cerny | G01M 17/0078 73/12.01 |
| 6,092,959 A * | 7/2000 | Leonhardt | B60R 19/00 256/13.1 |
| 6,244,637 B1 * | 6/2001 | Leonhardt | B60R 19/56 293/102 |
| 6,511,341 B1 | 1/2003 | Finona et al. | |
| 8,540,259 B1 * | 9/2013 | Young | B62D 21/155 280/124.109 |
| 8,589,062 B2 | 11/2013 | Kelly et al. | |
| 9,182,942 B2 * | 11/2015 | Kelly | B60T 7/18 |
| 2002/0121144 A1 * | 9/2002 | Stein | G01M 17/007 73/862 |
| 2004/0251698 A1 * | 12/2004 | Welch | E01F 15/148 293/133 |

(Continued)

OTHER PUBLICATIONS https://www.digitaltrends.com/cool-tech/hovercart-hoverboard/.

*Primary Examiner* — Eric S. McCall
(74) *Attorney, Agent, or Firm* — Christopher G. Darrow; Darrow Mustafa PC

(57) ABSTRACT

A mobile platform structured for mounting a soft target thereon is provided. The mobile platform includes a self-propelled drive unit configured to move along a ground surface responsive to a control signal. The mobile platform also includes a hardened mobile platform control module coupled to the drive unit so as to move with the drive unit. The mobile platform also includes a sacrificial body structured and coupled to the drive unit so as to move along the ground surface with the drive unit.

13 Claims, 6 Drawing Sheets

(56) References Cited

U.S. PATENT DOCUMENTS

| | | | | |
|---|---|---|---|---|
| 2005/0081656 A1* | 4/2005 | Saari | | G01M 17/0078 73/865.3 |
| 2006/0207353 A1* | 9/2006 | McCoy | | G01M 17/0078 73/865.6 |
| 2006/0278026 A1* | 12/2006 | Friedman | | G01M 17/0078 73/865.6 |
| 2006/0290160 A1* | 12/2006 | Tencer | | B60N 2/062 296/68.1 |
| 2008/0011047 A1* | 1/2008 | Dragan | | G01M 17/0078 73/12.07 |
| 2008/0016970 A1* | 1/2008 | Klein | | G01M 17/0078 73/865.3 |
| 2008/0211243 A1 | 9/2008 | Woods et al. | | |
| 2010/0288013 A1* | 11/2010 | Moser | | G01M 17/0078 73/12.04 |
| 2011/0153298 A1* | 6/2011 | Stein | | G01M 17/0074 703/8 |
| 2011/0187135 A1* | 8/2011 | Kano | | B60R 19/34 293/133 |
| 2011/0192240 A1* | 8/2011 | Kruse | | G01M 17/0078 73/865.3 |
| 2012/0103056 A1* | 5/2012 | Kuriyama | | G01M 17/0078 73/12.01 |
| 2013/0016020 A1* | 1/2013 | Kelly | | H01Q 1/32 343/713 |
| 2013/0016027 A1* | 1/2013 | Kelly | | H01Q 1/088 343/882 |
| 2013/0017346 A1* | 1/2013 | Kelly | | B60T 7/22 428/33 |
| 2013/0018526 A1* | 1/2013 | Kelly | | G01M 17/0078 701/2 |
| 2013/0283902 A1* | 10/2013 | Kobayashi | | G01M 17/0078 73/118.01 |
| 2014/0283579 A1* | 9/2014 | Covic | | G01M 7/08 73/12.01 |
| 2015/0089995 A1* | 4/2015 | Lilley | | G01M 17/0078 73/12.07 |
| 2016/0047631 A1 | 2/2016 | Berman | | |
| 2016/0161372 A1* | 6/2016 | Eom | | G01M 17/0078 73/866.4 |
| 2018/0010984 A1* | 1/2018 | Silberling | | G09B 19/16 |

* cited by examiner

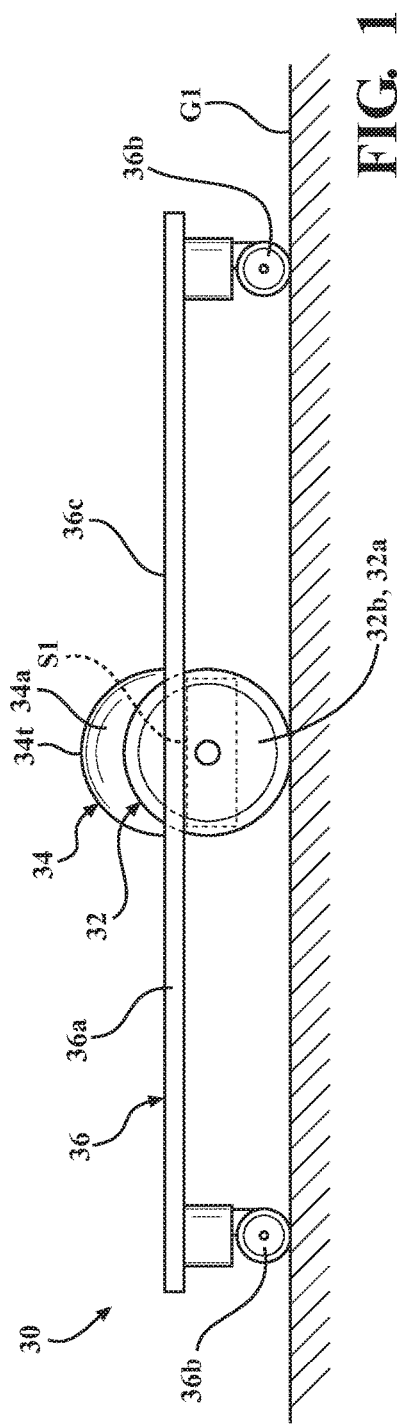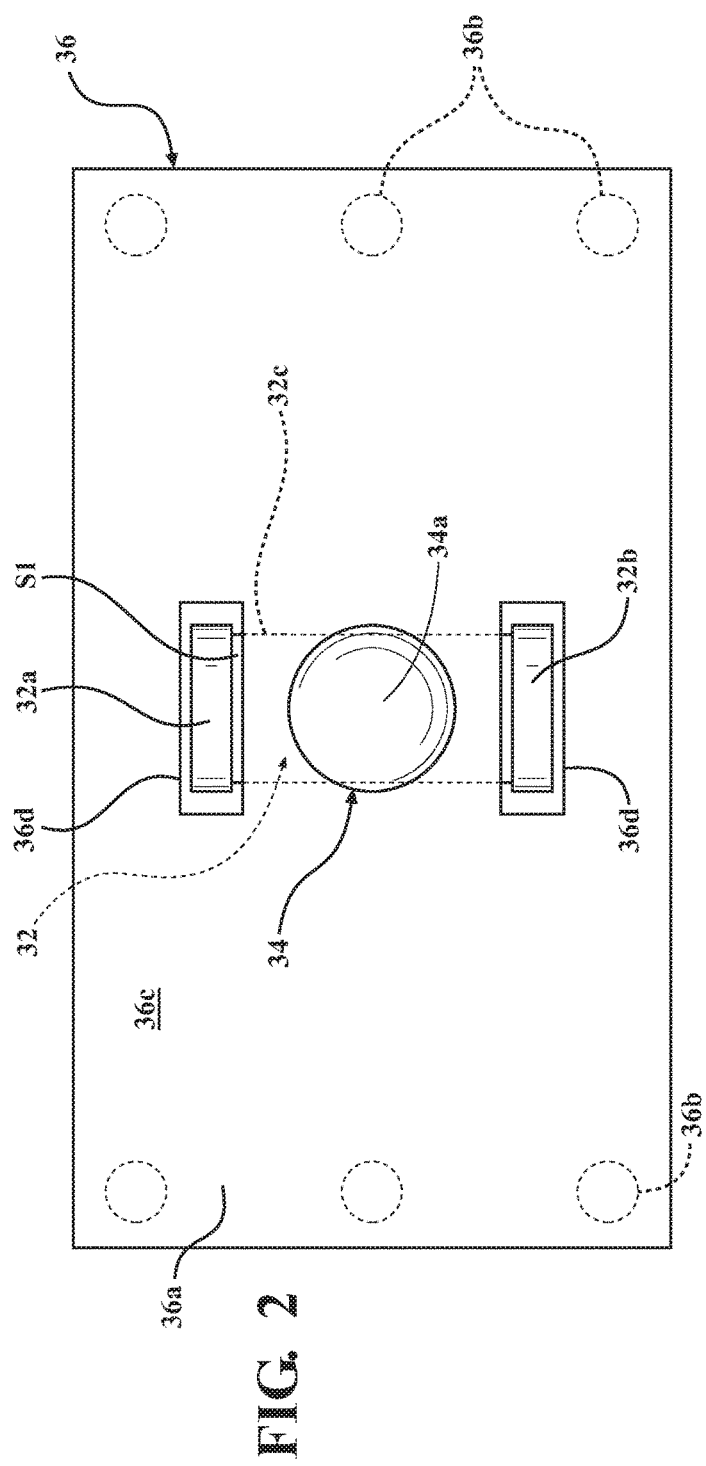

MOBILE PLATFORM WITH SACRIFICIAL BODY USED TO SIMULATE A VEHICLE DURING COLLISION TESTING

TECHNICAL FIELD

The subject matter described herein relates to systems and methods, including guided mobile platforms and guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A mobile platform may be utilized for testing vehicle technologies incorporated into a conventional passenger vehicle. The mobile platform may be structured to simulate aspects of a conventional vehicle so that a conventional passenger vehicle (or subject vehicle) may contact the mobile platform in a collision scenario. The mobile platform may be designed so that the subject vehicle may collide with the mobile platform without damage to either the test platform or the subject vehicle. This enables the testing of various technologies incorporated into the subject vehicle with minimal vehicle damage and no injury to personnel.

SUMMARY OF THE INVENTION

In one aspect of the embodiments described herein, a mobile platform structured for mounting a soft target thereon is provided. The mobile platform includes a self-propelled drive unit configured to move along a ground surface responsive to a control signal. The mobile platform also includes a hardened mobile platform control module coupled to the drive unit so as to move with the drive unit. The mobile platform also includes a sacrificial body structured and coupled to the drive unit so as to move along the ground surface with the drive unit.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 1 is a schematic side view of a mobile platform including a sacrificial body and a separable control module in accordance with an embodiment described herein.

FIG. 2 is a schematic plan view of the mobile platform embodiment shown in FIG. 1.

DETAILED DESCRIPTION

Figure 3:
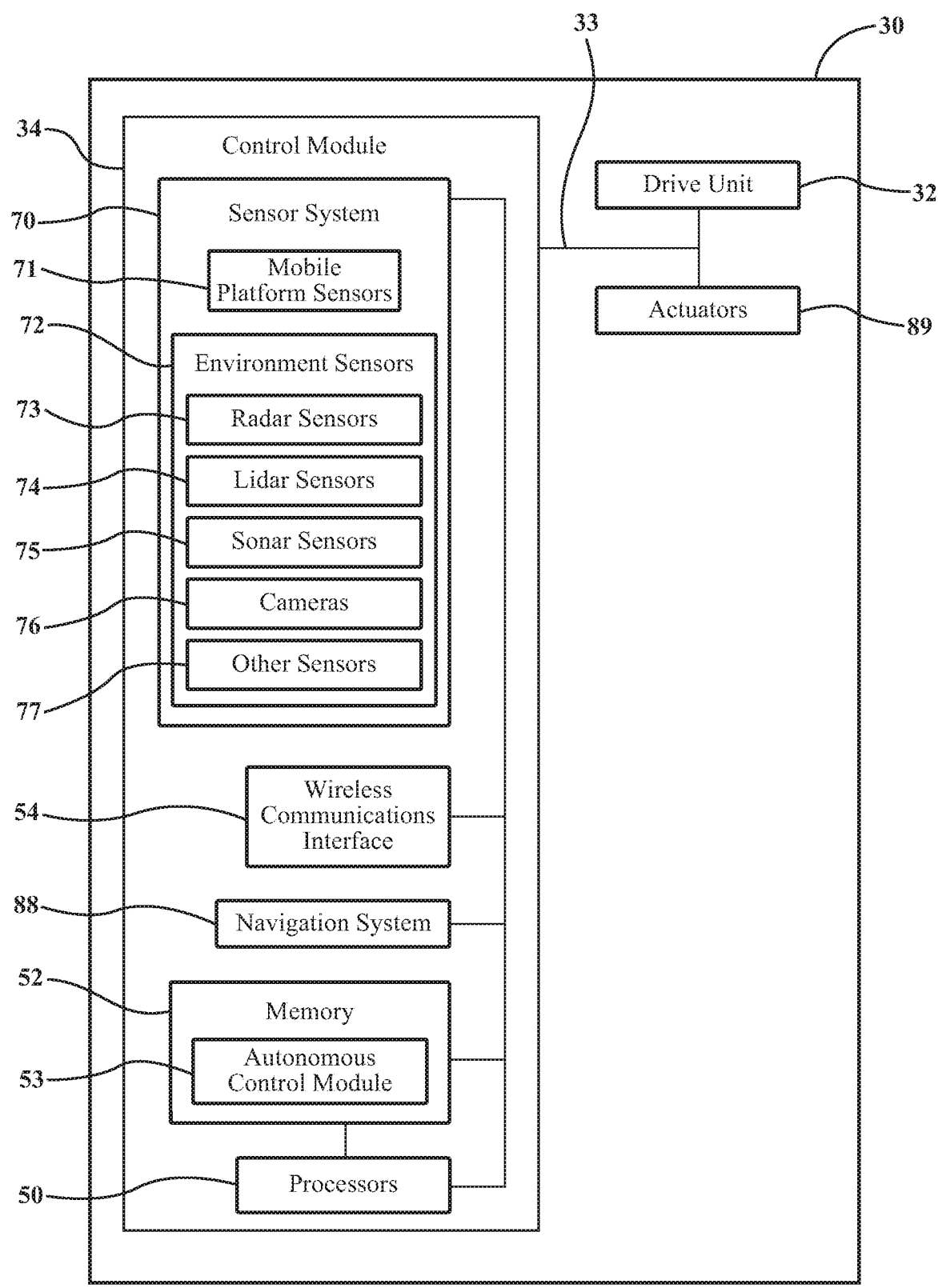
FIG. 3 is a block schematic diagram of the mobile platform of FIGS. 1 and 2 showing elements and systems configured to enable functioning of the platform as described herein.

Provided herein are embodiments of a mobile platform structured for mounting a soft target thereon. The mobile platform includes a self-propelled drive unit configured to move along a ground surface responsive to a control signal. The mobile platform also includes a hardened mobile platform control module coupled to the drive unit so as to move with the drive unit. The mobile platform also includes a sacrificial body structured and coupled to the drive unit so as to move along the ground surface with the drive unit. The sacrificial body is structured to be destructible and disposable responsive to a collision between the mobile platform and a subject vehicle. The mobile platform control module is attached to the sacrificial body and/or to the drive unit by breakaway connections so that the control module may easily separate from the remainder of the mobile platform during collision. The control module is also hardened to aid in preventing damage to components contained within the module housing. In a particular embodiment, the sacrificial body may have a first portion and a second portion structured to be separable from the first portion prior to a collision of the mobile platform with a subject vehicle. The mobile platform control module may be mounted on the body second portion. Separation of the body second portion from the body first portion may aid in preventing damage to the control module, while the body first portion absorbs the brunt of any collision.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIG. 1 is a schematic side view of a mobile platform 30 in accordance with embodiments described herein. FIG. 2 is a schematic plan view of the mobile platform embodiment shown in FIG. 1. Various elements (such as bumpers, a structure simulating a vehicle chassis, etc.)(not shown) may be attached to or mounted on the mobile platform 30 to provide a guided test platform which may interact with a conventional vehicle (i.e., a "subject vehicle" or "test vehicle") to test the vehicle sensors, warning systems, etc. A "subject vehicle" may be a vehicle undergoing testing which involves operation of the subject vehicle in the environment of the mobile platform 30 and which may involve collision or contact with the mobile platform. The subject vehicle may be a conventional motor vehicle (such as a passenger sedan, for example). The mobile platform 30 may be configured to operate autonomously in the same environment as the subject vehicle, where the platform and the subject vehicle may interact.

Referring to FIGS. 1-2, in one or more arrangements, the mobile platform 30 may include a self-propelled drive unit 32 configured to move along a road surface G1 responsive to a control signal. The mobile platform 30 may also include a hardened mobile platform control module 34 coupled to the drive unit 32 so as to move with the drive unit, and a sacrificial body 36 structured and coupled to the drive unit 32 so as to move along the road surface G1 with the drive unit 32.

The drive unit 32 may be any self-propelled device capable of moving along the road surface G1 in any of a variety of directions responsive to control commands as described herein. The drive unit 32 may include one or more road wheels, a power source (not shown), a drive train (not shown) coupling the power source to the wheel(s), electronics (also not shown) needed to receive process command signals, and any other components needed to enable the drive unit 32 to move along the road surface G1 as described herein. The drive unit 32 may also include one or more surfaces (such as surface S1) to which the mobile platform body 36 may be secured, so that the body 36 may move along the road surface G1 with the drive unit 32. The drive unit 32 may also have sufficient motive power to move itself as well as the mobile platform body 36 and the mobile platform control module 34 along the road surface G1 in a manner as described herein when the control module 34 and the body 36 are attached or coupled to the drive unit 32.

The drive unit 32 may be configurable to be remotely controllable. The terms "remote control", "remotely controllable", and "remotely generated control signal" relate to control signals or commands generated by a source external of the mobile platform 30. In addition to being configured to receive and respond to control commands from the control module 34, embodiments of the mobile platform 30 may be configured to move responsive to commands generated by a command source (for example, a remote control station) exterior of the mobile platform.

The drive unit 32 may be configurable to receive control commands from the mobile platform control module 34, from a remote source (i.e., a source (such as a remote facility or a remotely located user) external of the mobile platform), or from another source. Thus, in one or more arrangements, the control module 34 may be configured to generate commands directed to controlling movement of the drive unit 32, the drive unit 32 may be configured to be controllable to move responsive to commands received from the control module 34, and the control module 34 may be in operable communication with the drive unit 32.

Electrical/electronic connections between the control module 34 and the drive unit 32 may be via separable or "breakaway" mateable connectors (not shown) which are structured to remain in a mated condition during normal operation of the mobile platform, but which may be easily separable during a collision between the mobile platform and a subject vehicle, to aid in preventing damage to the control module. Alternatively, the drive unit 32 and the control module 34 may be configurable for wireless communication.

In one or more arrangements, the drive unit 32 is in the form of a self-balancing scooter which is adaptable for control by means other than contact of pressure-sensitive sensors by a user's feet. Such self-balancing scooters are known and/or commercially available, and methods for manufacturing the scooters (or modifying) them for remote or alternative control are known. For example, in the embodiment shown in FIGS. 1-2, the self-balancing scooter has a pair of opposed road wheels 32a, 32b and a frame 32c extending between and connecting the road wheels. The power source may be a rechargeable battery housed in the frame 32c. The drive train, operating electronics, and other elements of the scooter may also be contained within the frame 32c.

Although the mobile platform embodiments described herein will incorporate a self-balancing scooter as a drive unit, it will be understood that any of a variety of alternative motive power sources may be used, provided that they are adaptable to the control methods described herein, accommodate attachment of a mobile platform body thereto, and are capable of moving the remote platform (including the body, control module, and other attached elements) in a manner required for subject vehicle testing purposes.

Body 36 may be structured to be easily and rapidly attachable or connectible to a portion of the drive unit 32 so that the body will move along the ground surface in conjunction with the drive unit 32. Body 36 may include a mounting portion 36a and a plurality of rollers or casters 36b extending from the mounting portion to the road surface G1. Casters 36b may enable the mobile platform body 36 to readily move in any direction in which the drive unit 32 is commanded to move.

The mounting portion 36a may be structured to be directly attachable or otherwise connectible to the drive unit 32 (for example, to drive unit surface S1 as shown in FIGS. 1-2). In addition, for vehicle testing purposes, the body mounting portion 36a may have dimensions sufficient to permit a structure (not shown) simulating a vehicle chassis to be mounted onto a top surface 36c of the body 36 to create a "guided soft target" usable for testing subject vehicle sensors, warning systems, and occupant protection systems. The mobile platform/guided soft target may operate autonomously or under remote control so as to interact with subject vehicles in any of a variety of test scenarios.

The term "sacrificial" as applied to the body 36 means that the body may be structured to be frangible or breakable into separate pieces responsive to collision with a subject vehicle wheel or body. Thus, a sacrificial body 36 as described herein is structured to be disposable or non-reusable after breakage. To these ends, the body 36 may be formed from inexpensive, relatively fragile and easily replaceable materials and or components. The material(s) of the body 36 may also have (or be configurable to provide) the rigidity necessary to support any components mounted on the body, and also to support any connections to component(s) to which the body 36 is attached. Examples of materials suitable for use in constructing the body 36 include wood and polymers.

In an embodiment as shown in FIGS. 1-2 in which the drive unit 32 is in the form of a self-balancing scooter, body 36 may be rigidly attached to the frame 32c of the scooter using fasteners, brackets, or any other suitable means. Cutouts 36d may be provided in the body 36 to enable wheels of the 32a, 32b of the drive unit 32 to extend therethrough.

The control module 34 may include a hardened housing 34a which contains the various mobile platform sensors, processors, and other mobile platform control elements described herein. In one or more arrangements, the housing 34a may have a hemispherical or "dome" shape. The control module 34 is configured to be reusable after collision or other physical contact between the mobile platform 30 and a subject vehicle. Thus, the term "hardened" as applied to the control module 34 means that the control module housing 34a may be structured to enable at least one wheel of a motor vehicle (such as an autonomous subject vehicle) to drive up along a side of the control module housing 34a, and onto, along, and over a top surface 34t of the control module housing with minimal or no damage to the control module sensors and other components contained within the housing, due to the wheel driving along the housing. The top surface 34t of the control module housing 32a may be an uppermost surface of the housing 34a when the housing is mounted on the body 36 or drive unit 32 in a configuration of the mobile platform 30 that is rollable along the road surface G1.

The term "hardened" also signifies that the control module 34 may be structured to withstand contact with a moving subject vehicle with minimal or no damage to the control module sensors and other components contained within the housing. To this end, the hardened control module 34 may incorporate internal cushioning, suspension elements, and/or other features inside the housing which are configured to aid in preventing and/or minimizing damage (due to impact forces, for example) to the sensors and other components mounted in the housing. The control module housing 34a may be formed from any suitable material, for example, a steel.

FIG. 3 is a schematic block diagram showing various elements and systems for controlling operations of the mobile platform 30. The mobile platform 30 can have any combination of the various elements shown in FIG. 3. The mobile platform 30 may have more or fewer elements and/or systems than shown. The mobile platform 30 may also include alternative elements and/or systems to those shown. In some arrangements, the mobile platform 30 may be implemented without one or more of the elements shown in FIG. 3. Various elements of the control module 34 and the mobile platform 30 may communicate using a system bus 33.

The mobile platform 30 can include one or more processors 50. In one or more arrangements, the processor(s) 50 can be a main processor of the mobile platform 30. For instance, the processor(s) 50 can be an electronic control unit (ECU). The processor(s) 50 may be operably connected to other elements of the mobile platform for receiving information from the other elements and for issuing control commands to the other elements, to control or aid in controlling operations of the mobile platform. The terms "operably connected" and "operably coupled" as used throughout this description, can include direct or indirect connections, including connections without direct physical contact. The processor(s) 50 may be located in the control module 34 or outside the control module.

One or more memories 52 may be operably coupled to the processor(s) 50 for storing an autonomous control module 53 (described below), other modules, and any data and other information needed for diagnostics, operation, control, etc. of the mobile platform. The memories 52 may be one or more of a random-access memory (RAM), read-only memory (ROM), a hard-disk drive, a flash memory, or other suitable memory for storing the required modules and information. The memories may be located in the control module 34 or outside the control module.

Some or all operations of the mobile platform 30 may be autonomously controlled, for example, by one or more autonomous control module(s) 53. As used herein, "autonomous control" refers to controlling various aspects of the movement and/or other operations of the mobile platform 30 with minimal or no input from a human operator. In one or more embodiments, the mobile platform 30 is highly automated or completely automated. Generally, "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium, such as memory 52. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In addition to the autonomous control module 53, one or more other modules (not shown) for other purposes may be incorporated into the mobile platform 30. Any of the modules can be implemented as computer-readable program code that, when executed by processor(s) 50, autonomously implement various mobile platform control functions. Such functions may include control of the various mobile platform systems described herein. One or more of the modules can be a component of the processor(s) 50, or one or more of the modules can be executed on and/or distributed among other processing systems to which the processor(s) 50 is operably connected. The modules can include instructions (e.g., program logic) executable by the one or more processor(s) 50. In one or more arrangements, one or more of the mobile platform modules can include artificial or computational intelligence elements, e.g., neural network, fuzzy logic or other machine learning algorithms. Further, in one or more arrangements, the functions of one or more of the modules can be distributed among a plurality of the modules described herein. In one or more arrangements, two or more of the modules can be combined into a single module.

The autonomous control module 53 and/or processor(s) 50 can be configured to receive data from the sensor system 70 and/or any other type of system or element capable of acquiring information relating to the mobile platform 30 and/or the external environment of the mobile platform 30. In one or more arrangements, the autonomous control module 53 and/or processor(s) 50 can use such data in controlling the mobile platform. The autonomous control module 53 can determine position and velocity of the mobile platform 30. The autonomous control module 53 can be configured to receive and/or determine location information for neighboring vehicles and other environmental features. Information acquired by the autonomous control module 53 may be used to determine the current state of the mobile platform 30 and/or to estimate position and orientation of the mobile platform 30 with respect to its environment. The autonomous control module 53 can control various operations of the mobile platform 30 either alone or in combination with processor(s) 50.

The autonomous control module 53 can be configured to determine travel path(s), current autonomous maneuvers for the mobile platform 30, future autonomous maneuvers and/or modifications to current autonomous maneuvers based on data acquired by the sensor system 70 and/or data from any other suitable source. "Autonomous maneuver" means one or more actions that affect the movement of the mobile platform 30. Examples of autonomous maneuvers include accelerating, decelerating, braking, turning, and/or reversing, just to name a few possibilities. The autonomous control module 53 can be configured to implement determined autonomous maneuvers. The autonomous control module 53 can cause, directly or indirectly, such autonomous maneuvers to be implemented. As used herein, "cause" or "causing" means to make, command, instruct, and/or enable an event or action to occur or at least be in a state where such event or action may occur, either in a direct or indirect manner. The autonomous control module 53 can be configured to execute various vehicle control functions and/or to transmit data to, receive data from, interact with, and/or control the mobile platform 30 and/or one or more systems thereof.

In one or more arrangements, some or all operations of the mobile platform 30 may be controlled remotely, for example, by radio control from a remote station (not shown). To enable wireless control of the platform 30, the platform may be provided with a wireless communications interface 54. In one or more embodiments, the mobile platform 30 is configured with one or more semi-autonomous operational modes in which one or more computing systems perform a portion of the navigation and/or maneuvering of the mobile platform, and a human operator provides inputs to the mobile platform to perform a portion of the navigation and/or maneuvering of the mobile platform 30.

In one or more arrangements, the drive unit control functions may be separable from other control functions so that, for example, the drive unit may be controlled remotely while other operations of the mobile platform may be controlled autonomously by the control module.

As noted above, the mobile platform 30 can include the sensor system 70. The sensor system 70 can include one or more sensors. "Sensor" means any device, component and/or system that can detect, and/or sense something. The one or more sensors can be configured to detect, and/or sense in real-time. As used herein, the term "real-time" means a level of processing responsiveness that system senses as sufficiently immediate for a particular process or determination to be made, or that enables the processor to keep up with some external process.

In arrangements in which the sensor system 70 includes a plurality of sensors, the sensors can function independently from each other. Alternatively, two or more of the sensors can work in combination with each other. In such a case, the two or more sensors can form a sensor network. The sensor system 70 and/or the one or more sensors can be operably connected to the processor(s) 50, control module 53 and/or another element of the mobile platform 30 (including any of the elements shown in FIG. 3).

The sensor system 70 can include any suitable type of sensor. Various examples of different types of sensors are described herein. However, it will be understood that the embodiments are not limited to the particular sensors described. The example sensors may include one or more environment sensors 72 and/or one or more mobile platform sensors 71. However, it will be understood that the embodiments are not limited to the particular sensors described.

The mobile platform sensor(s) 71 can detect, determine, and/or sense information about the mobile platform 30 itself. In one or more arrangements, the mobile platform sensor(s) 71 can be configured to detect, and/or sense position and orientation changes of the mobile platform 30, such as, for example, based on inertial acceleration. The mobile platform sensor(s) 71 may include one or more sensors configured to detect position and motion parameters of the mobile platform 30. In one or more arrangements, the mobile platform sensor(s) 71 can include one or more accelerometers, one or more gyroscopes, an inertial measurement unit (IMU), a dead-reckoning system, a global navigation satellite system (GNSS), a global positioning system (GPS), a navigation system 88, and/or other suitable sensors. In one or more arrangements, the mobile platform sensor(s) 71 can include a speedometer to determine a current speed of the mobile platform 30. Mobile platform sensors 71 may include sensors configured to detect conditions indicative of a collision between the mobile platform 30 and a subject vehicle.

Environment sensors 72 may be configured to acquire, and/or sense mobile platform environment data. "Mobile platform environment data" includes data and/or information about the external environment in which the mobile platform is located. For example, the one or more environment sensors 72 can be configured to detect, quantify and/or sense vehicles and/or obstacles in at least a portion of the external environment of the mobile platform 30 and/or information/data about such vehicle and/or obstacles. Such obstacles may be stationary objects and/or dynamic objects. Sensor system 70 may include one or more sensors configured to detect position and motion parameters of a subject vehicle in an external environment of the mobile platform 30. Environment sensors 72 may include sensors configured to detect conditions indicative of a pending collision between the mobile platform 30 and a subject vehicle.

The one or more environment sensors 72 can be configured to detect, measure, quantify and/or sense other things in the external environment of the mobile platform 30, such as, for example, vehicles, lane markers, signs, traffic lights, traffic signs, lane lines, crosswalks, curbs proximate the mobile platform 30, off-road objects, etc. As an example, in one or more arrangements, the sensor system 70 can include one or more radar sensors 73, one or more LIDAR sensors 74, one or more sonar sensors 75, and/or one or more cameras 76. In addition, other types of sensors 77 may be incorporated into the sensor system 70 for various purposes, depending on the specific test requirements and operational requirements of the mobile platform 30.

In one or more arrangements, the control module 34 may be mounted on a first or top surface 36c of the body 36 after the body has been secured to the drive unit 32. In other arrangements, the control module 34 may be mounted directly to the drive unit 32. For example, in the embodiment shown in FIGS. 1-2, the body 36 may be mounted directly to the frame 32c of the scooter. In embodiments described herein, the control module 34 may be mounted to the body 36 and/or to the drive unit 32 using known breakaway fasteners or other breakaway-type means (not shown), which enable the control module 34 to separate from the body 36 and/or drive unit 32 responsive to collision between the mobile platform 30 and a subject vehicle. This may enable the control module 34 to be forced out of the path of the subject vehicle during collisions, thereby minimizing collision damage to the control module.

The mobile platform 30 can include one or more actuators 89. The actuators 89 can be any element or combination of elements operable to modify, adjust and/or alter one or more of the mobile platform systems or components thereof responsive to receiving signals or other inputs from the processor(s) 50 and/or the autonomous control module 53.

Any suitable actuator can be used. For instance, the one or more actuators 89 can include motors, pneumatic actuators, hydraulic pistons, relays, solenoids, and/or piezoelectric actuators, just to name a few possibilities.

Referring now to FIGS. 4A-6, another embodiment 130 of the mobile platform may include a drive unit 132 structurally and functionally similar to drive unit 32 previously described. The mobile platform 130 may also include a sacrificial body 136 coupled to the drive unit 132, and a control module 134 coupled to the body 136 as shown in the previously described embodiment. Except as otherwise described herein, control module 134 may be structurally and functionally similar to previously described control module 34. However, in the embodiment shown in FIGS. 4A-6, the body 136 may include a body first portion 136-1 coupled to the drive unit 132 so as to move along the ground surface G1 with the drive unit. The body first portion 136-1 may have a mounting portion 136-1a. The body 136 may also include a body second portion 136-2 separate from the body first portion 136-1 and structured to enable the body second portion 136-2 to move along the ground surface G1 separately from the body first portion 136-1. The body second portion 136-2 may have a mounting portion 136-2a. In addition, the mobile platform 130 may include a coupling mechanism (generally designated 140) structured to couple together the body second portion 136-2 and the drive unit 132 so that the body second portion 136-2 also moves along the ground surface G1 with the drive unit 132. Also, control module 134 may attached to the body second portion 136-2.

In the embodiment shown in FIGS. 4A-6, the mobile platform 130 may be structured so that the body second portion 136-2 (containing the control module 134) is separable from the drive unit 132 and body first portion 136-1 when a collision with a subject vehicle or other object is pending or determined to be likely. Separation of the body second portion 136-2 and the attached control module 134 from the remainder of the mobile platform 130 prior to contact of the mobile platform with the subject vehicle may further aid in protecting the control module 134 from damage.

Figure 4A:
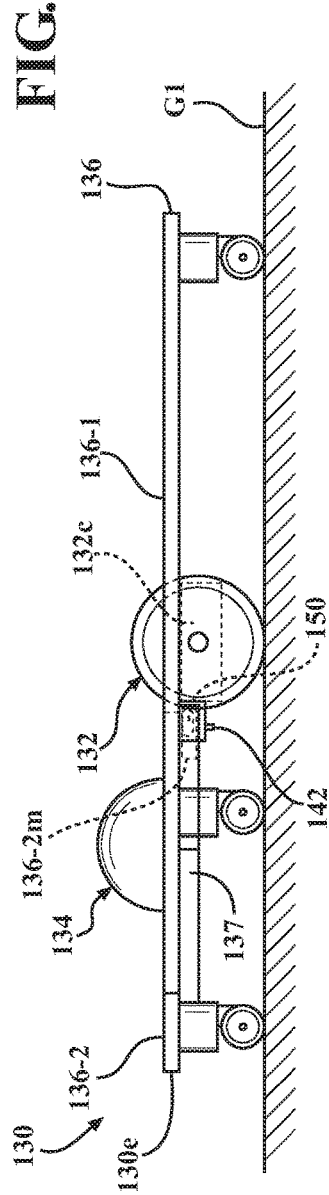
FIG. 4A is a schematic side view of a mobile platform including a sacrificial body and a separable control module in accordance with another embodiment described herein.
Figure 4B:
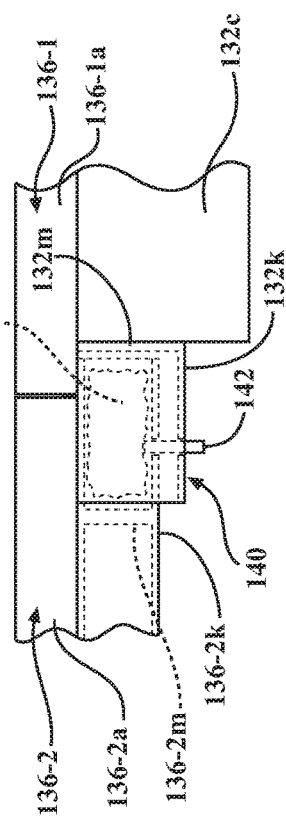
FIG. 4B is a magnified view of a portion of the mobile platform shown in FIG. 4A.

Referring to FIGS. 4A-4B, in one or more particular arrangements, the coupling mechanism 140 may include a drive unit coupling member 132k coupled to the drive unit 132 and a body second portion coupling member 136-2k coupled to the body second portion 136-2. The body second portion coupling member 136-2k may be structured to be mateable with the drive unit coupling member 132k. The drive unit coupling member 132k may be, for example, a hollow metal tube similar to a portion of a conventional trailer hitch, extending from the drive unit 132 toward an end 130e of the mobile platform. The end 130e of the mobile platform 130 may be designated a rear end of the mobile platform for operational purposes.

A carriage 137 may be structured to support the body second portion mounting portion 136-2a. The body second portion coupling member 136-2k may be in the form of a hollow metal tube similar to a portion of a conventional trailer hitch, extending from the carriage 137 and into the drive unit coupling member 132k.

A first inner wall 132m may be positioned in the drive unit coupling member 132k and a second inner wall 136-2m may be positioned in the second body portion coupling member 136-2k so as to reside opposite the first inner wall 132m when the second body portion coupling member 136-2k is inserted into the drive unit coupling member 132k. The spaces in drive unit coupling member 132k between the inner wall 132m and the end of the drive unit coupling member and between the inner wall 136-2m and the end of the second body portion coupling member 136-2k provide a cavity into which a separation mechanism (described in greater detail below) may be inserted.

At least one pyrotechnic fastener 142 may be inserted into coaxial holes formed in the second body portion coupling member 136-2k and the drive unit coupling member 132k. The pyrotechnic fastener(s) 142 may be structured to maintain the second body portion coupling member 136-2k and the drive unit coupling member 132k in a mated condition prior to deactivation of the fastener(s) 142. The pyrotechnic fastener(s) 142 may also be breakable or deactivable so as to disable the coupling mechanism 140, thereby enabling the second body portion coupling member 136-2k to unmate with the drive unit coupling member 132k. Thus, the coupling mechanism may be enabled by mating the coupling members 136-2k and 132k and inserting pyrotechnic fastener(s) 142 to maintain engagement of the coupling members. The pyrotechnic fasteners 142 may be structured to break responsive to receipt of an electric current or other signal from processor(s) 50 or another signal source, thereby deactivating the coupling mechanism 140. The pyrotechnic fastener(s) 142 may be hard-wired to a suitable activation signal source (not shown) via a system bus 133.

The mobile platform 130 may further incorporate a separation mechanism (generally designated 150) structured to be operable to separate the second body portion 136-2 from the drive unit 132 after disabling of the coupling mechanism 140 and responsive to a control command. This separation of the second body portion 136-2 from the drive unit 132 enables the second body portion to move along the ground surface separately from the body first portion.

Referring to FIGS. 4A and 4B, in one or more arrangements, the separation mechanism 150 may be in the form of a pressurized gas source interposed between inner wall 136-2m of the second body portion coupling member 136-2k and inner wall 132m of the drive unit coupling member 132k. The pressurized gas source may be structured to be activable to generate a pressurized gas sufficient to unmate the second body portion coupling member 136-2k and the drive unit coupling member 132k after deactivation of pyrotechnic fastener(s) 142. The pressurized gas source may be an electrically activable squib or similar gas-generating mechanism. The pressurized gas source may be hard-wired or wirelessly connected to a suitable activation signal source (not shown) via a system bus 133.

Figure 5:
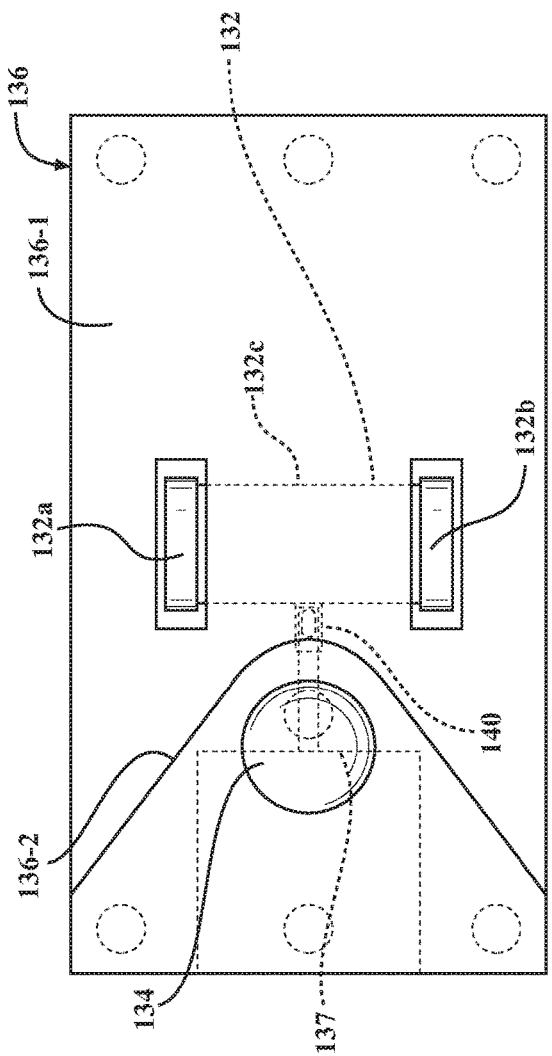
FIG. 5 is a schematic plan view of the mobile platform embodiment shown in FIGS. 4A-4B.
Figure 6:
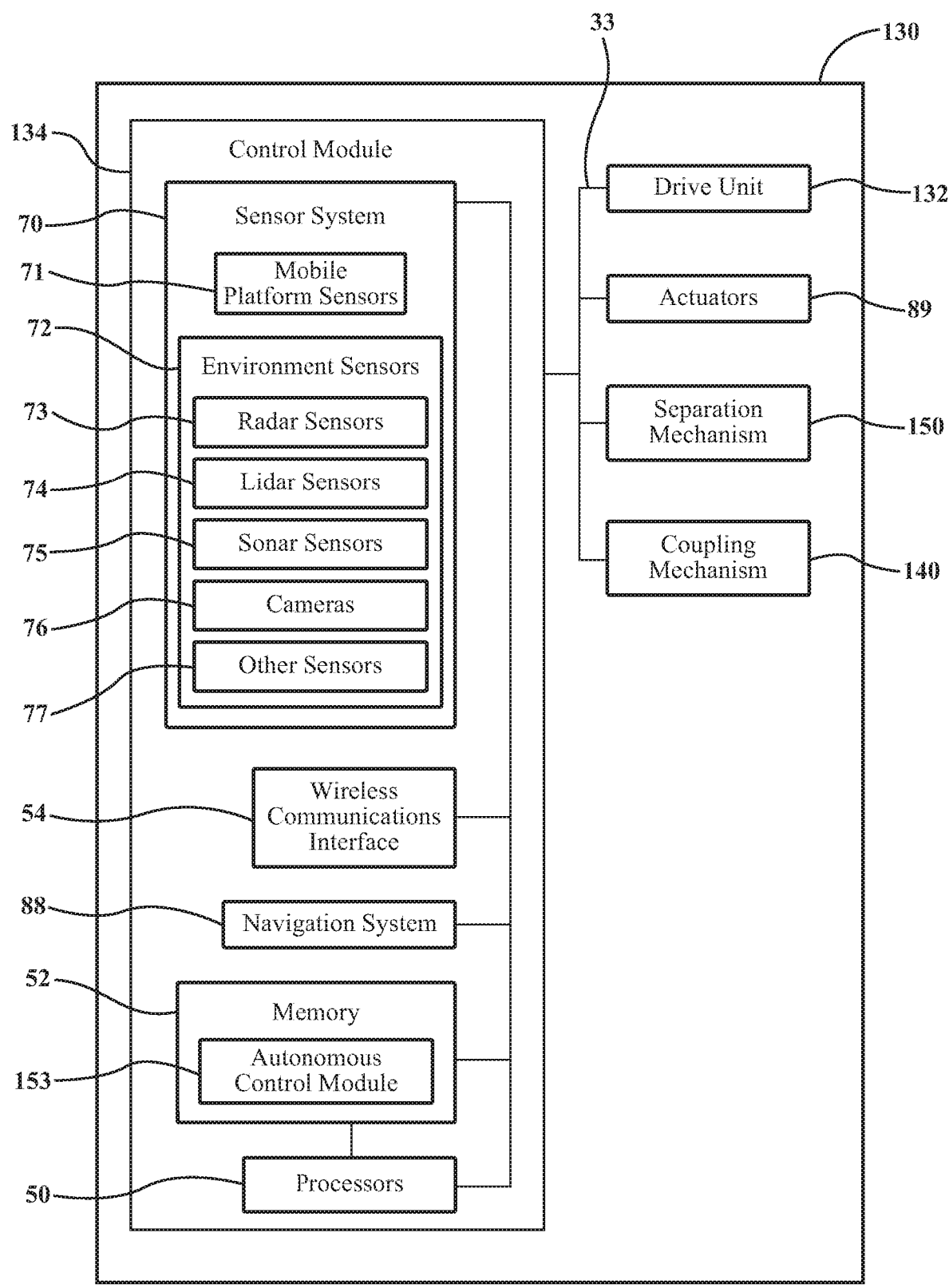
FIG. 6 is a block schematic diagram of the mobile platform of FIGS. 4A-5 showing elements and systems configured to enable functioning of the platform as described herein.

FIG. 6 is a schematic block diagram showing various elements and systems for controlling operations of the mobile platform 130 shown in FIGS. 4A-5. These elements and system may be the same or substantially the same as those described in relation to FIG. 3, and are shown numbered the same or similarly. However, the autonomous control module 153 of FIG. 6 may also be configured for controlling all aspects relating to separation of second body portion 136-2 from the drive unit 132 as described herein. Also, mobile platform 130 may include embodiments of the coupling mechanism 140 and separation mechanism 150 as described herein.

The mobile platform 130 can have any combination of the various elements shown in FIG. 6. The mobile platform 130 may have more or fewer elements and/or systems than shown. The platform 130 may also include alternative elements and/or systems to those shown. In some arrangements, the mobile platform 130 may be implemented without one or more of the elements shown in FIG. 6. Various elements of the control module 134 and the mobile platform 130 may also communicate using a system bus 33 as previously described.

Operation of the mobile platform 130 will now be discussed with reference to FIGS. 7-9.

In one or more arrangements, the coupling mechanism 140 may be designed to maintain coupling between the drive unit 132 and the second body portion 136-2 even if the separation mechanism 150 is activated inadvertently. This helps ensure that the second body portion 136-2 will remain connected to the drive unit 132 during all movements of the drive unit until it is desired to decouple or detach the second body portion 136-2 from the drive unit 132.

The method of disabling the coupling mechanism 140 may depend on the particular design of the coupling mechanism. The particular coupling mechanism embodiment 140 described herein may be considered to be disabled when the second body portion is separable from the drive unit by operation of the separation mechanism. Thus, the coupling mechanism 140 described herein may be disabled by deactivating fastener(s) 142.

Figure 7:
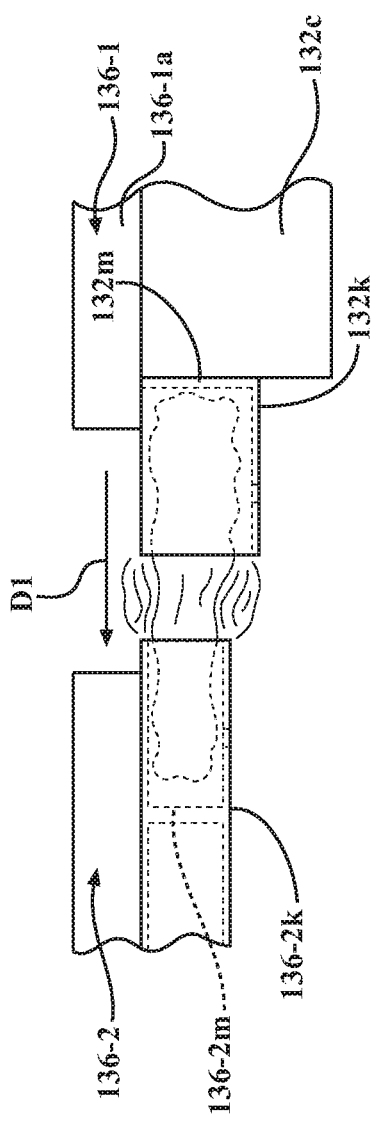
FIG. 7 is a view similar to the magnified view of FIG. 4B showing a separation operation of the mobile platform of FIGS. 4A-6.
Figure 8:
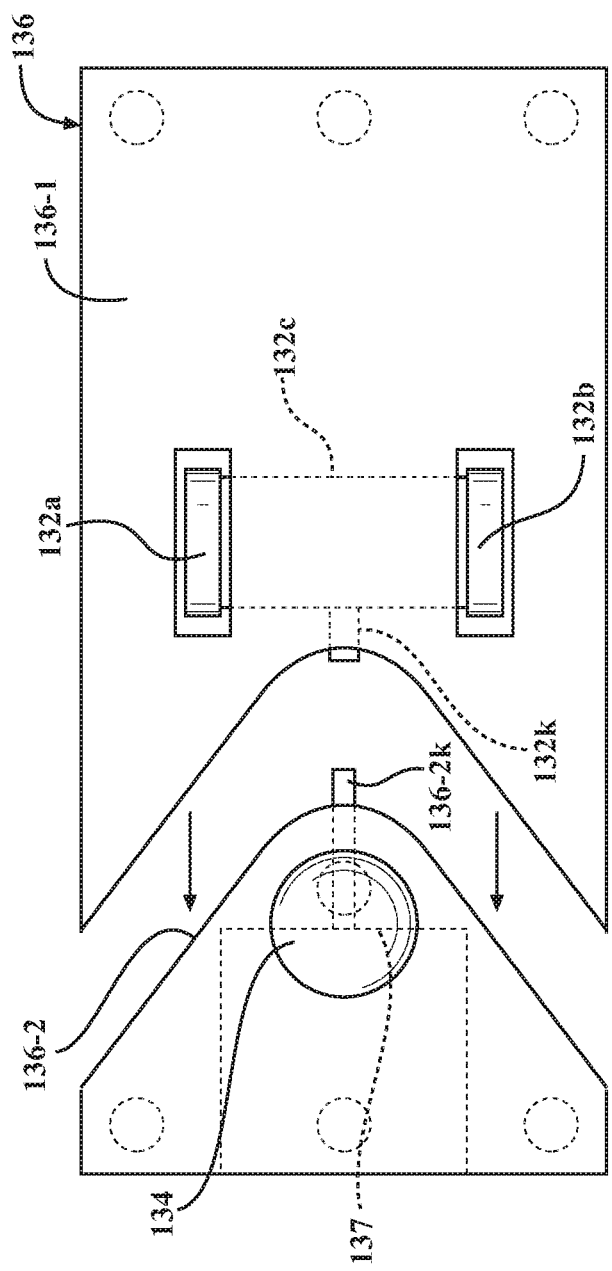
FIG. 8 is a view similar to the view of FIG. 5 showing a separation operation of the mobile platform of FIGS. 4A-6.

Referring to FIGS. 7-8, in embodiments described herein, separation of the second body portion 136-2 from the drive unit 132 may be performed in response to a determination by the control module 134 that the mobile platform is in a pending collision condition in which one of the mobile platform 130 and a subject vehicle is determined to be on a collision course with the other one of the mobile platform 130 and the subject vehicle. To implement in this operational mode, the autonomous control module 153 may include instructions to determine, using at least data from the one or more sensors 70, if either one of the mobile platform 130 and a subject vehicle is on a collision course with the other one of mobile platform 130 and the subject vehicle. For example, the autonomous control module 153 or other locations in memory 52 may include instructions that when executed by the processor(s) 50 cause the processor(s)s to determine if one or both of the mobile platform 30 and the subject vehicle are moving, and the direction(s) and speed(s) of movement. The autonomous control module 153 may further include instructions to, if one of the mobile platform 130 and the subject vehicle is determined to be on a collision course with the other one of the mobile platform 130 and the subject vehicle, estimate an amount of time until contact between the subject vehicle and the mobile platform.

The autonomous control module 153 may further include instructions to deactivate the coupling mechanism 140 so as to enable the second body portion 136-2 to unmate or decouple from the drive unit 132 at least a predetermined amount of time prior to expiration of the estimated amount of time until contact between the subject vehicle and the mobile platform 130. In the mobile platform embodiment 130, the autonomous control module 153 may cause generation of an electrical current resulting in breaking of the pyrotechnic fastener(s) 142. The autonomous control module 153 may further include instructions to, after deactivation of the coupling mechanism 140, activate the separation mechanism 150 to actively separate the second body portion 136-2 from the drive unit 132. In the mobile platform embodiment 130 described herein, the autonomous control module 153 may generate a command activating the separation mechanism (i.e., the pressurized gas source) 150 positioned between the mated second body portion coupling member 136-2k and drive unit coupling member 132k. Pressurized gas resulting from activation of the pressurized gas source 150 may forcibly unmate the second body portion coupling member 136-2k and the drive unit coupling member 132k, thereby allowing the second body portion 136-2 to move independently of the body first portion 136-1. The force exerted by the pressurized gas may also push the second body portion 136-2 in a direction away from the body first portion 136-1 and potentially out of the direct path of an oncoming subject vehicle, thereby preventing or mitigating possible collision damage to the control module 34. Separation of the body second portion 136-2 from the body first portion 136-1 may aid in preventing damage to the control module 134, while the body first portion 136-1 absorbs the brunt of any collision.

Figure 9:
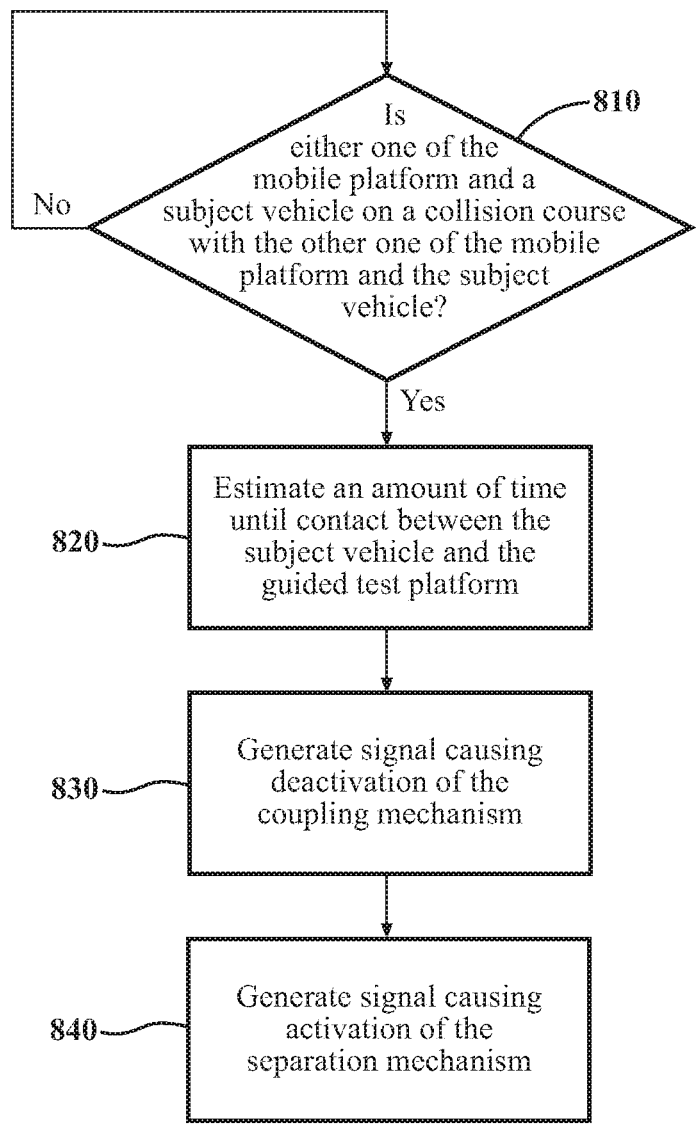
FIG. 9 is a flow diagram illustrating operation of the embodiment of the mobile platform shown in FIGS. 4-6.

FIG. 9 is a flow diagram illustrating operation of the mobile platform 130 for a pending collision condition. The mobile platform sensor system 70 may continuously scan an environment of the mobile platform, to detect vehicles and/or obstacles. In block 810, the processor(s) 50 may determine, using at least data from the sensors 70, if either one of the mobile platform 130 and a subject vehicle is on a collision course with the other one of the mobile platform 130 and the subject vehicle. If one of the mobile platform 130 and the subject vehicle is determined not to be on a collision course with the other one of the mobile platform 130 and the subject vehicle, the sensors 70 may continue scanning. If one of the mobile platform 130 and the subject vehicle is determined to be on a collision course with the other one of the mobile platform 130 and the subject vehicle, the processor(s) 50 may (in block 820) estimate an amount of time until contact between the subject vehicle and the mobile platform 130. The processor(s) 50 may then (in block 830) generate a signal causing deactivation of the coupling mechanism 140, thereby permitting unmating of the body second portion coupling member 136-2k and the drive unit coupling member 132k and separation of the body second portion 136-2 from the drive unit 132 and body first portion 136-1. The processor(s) 50 may then (in block 840) generate a signal causing activation of the separation mechanism 150, resulting in unmating of the body second portion coupling member 136-2k and the drive unit coupling member 132k and separation of the body second portion 136-2 from the drive unit 132 and body first portion 136-1.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods and/or operations described herein is suited. A typical combination of hardware and software can be a processing system with computer-usable program code that, when being loaded and executed, controls the processing system such that it carries out the methods and/or operations described herein. The systems, components and/or processes also can be embedded in a computer-readable storage, such as a computer program product or other data programs storage device, readable by a machine, tangibly embodying a program of instructions executable by the machine to perform methods and/or operations described herein. These elements also can be embedded in an application product which comprises all the features enabling the implementation of the methods described herein and, which when loaded in a processing system, is able to carry out these methods.

Furthermore, arrangements and/or operations described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A mobile platform comprising:
a self-propelled drive unit configured to move along a ground surface responsive to a control signal;
a hardened mobile platform control module coupled to the drive unit so as to move with the drive unit; and
a sacrificial body structured and coupled to the drive unit so as to move along the ground surface with the drive unit,
the drive unit and the control module being connected by one or more breakaway connections structured to enable the control module to separate from the drive unit responsive to a collision of the mobile platform with another object.

2. The mobile platform of claim 1 wherein the drive unit comprises a self-balancing scooter.

3. The mobile platform of claim 2 wherein the body is attached to a frame of the self-balancing scooter.

4. The mobile platform of claim 1 wherein the drive unit is configured to be remotely controllable.

5. The mobile platform of claim 1 wherein the control module is attached to the body.

6. The mobile platform of claim 1 wherein the control module includes a hemispherically-shaped housing.

7. The mobile platform of claim 1 wherein the control module is configured to generate commands directed to controlling movement of the drive unit, wherein the drive unit is configured to be controllable to move responsive to commands received from the control module, and wherein the control module is in operable communication with the drive unit.

8. The mobile platform of claim 1 wherein the body comprises a body first portion coupled to the drive unit so as to move along the ground surface with the drive unit, a body second portion separate from the body first portion, and a coupling mechanism structured to couple together the body second portion and the drive unit so that the body second portion moves along the ground surface with the drive unit, the control module being attached to the body second portion.

9. The mobile platform of claim 8 further comprising a separation mechanism structured to be operable to separate the body second portion from the drive unit after disabling of the coupling mechanism and responsive to a control command, so as to enable the body second portion to move along the ground surface separately from the body first portion.

10. The mobile platform of claim 9 wherein the coupling mechanism comprises:
a drive unit coupling member coupled to the drive unit;
a body second portion coupling member coupled to the body second portion, the body second portion coupling member being structured to be mateable with the drive unit coupling member; and
at least one pyrotechnic fastener structured to maintain the body second portion coupling member and the drive unit coupling member in a mated condition prior to deactivation of the at least one pyrotechnic fastener,
and wherein the at least one pyrotechnic fastener is structured to be deactivable to enable the body second portion coupling member to unmate with the drive unit coupling member.

11. The mobile platform claim 10 wherein the separation mechanism comprises a pressurized gas source interposed between a portion of the body second portion coupling member and a portion of the drive unit coupling member, and wherein the pressurized gas source is structured to be activable to generate a pressurized gas having a pressure sufficient to unmate the body second portion coupling member and the drive unit coupling member after deactivation of the at least one pyrotechnic fastener.

12. The mobile platform of claim 11 wherein the pressurized gas source comprises at least one squib.

13. The mobile platform of claim 9 further comprising one or more processors and a memory communicably coupled to the one or more processors and storing an autonomous control module including instructions that when executed by the one or more processors cause the one or more processors to generate a control command resulting in operation of the separation mechanism so as to separate the body second portion from the drive unit.

* * * * *